United States Patent
Reeves et al.

(10) Patent No.: US 8,554,912 B1
(45) Date of Patent: Oct. 8, 2013

(54) ACCESS MANAGEMENT FOR WIRELESS COMMUNICATION DEVICES FAILING AUTHENTICATION FOR A COMMUNICATION NETWORK

(75) Inventors: Raymond Emilio Reeves, Olathe, KS (US); Simon Youngs, Overland Park, KS (US); Mark Douglas Peden, Olathe, KS (US); Gary Duane Koller, Overland Park, KS (US); Piyush Jethwa, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 212 days.

(21) Appl. No.: 13/047,047

(22) Filed: Mar. 14, 2011

(51) Int. Cl.
*G06F 15/173* (2006.01)
*G06F 21/00* (2013.01)
*G06F 7/04* (2006.01)
*G06Q 10/00* (2012.01)
*H04M 1/66* (2006.01)

(52) U.S. Cl.
USPC ............ 709/225; 455/410; 726/27; 713/182; 705/2

(58) Field of Classification Search
None
See application file for complete search history.

(56) References Cited

U.S. PATENT DOCUMENTS

| | | | |
|---|---|---|---|
| 6,944,449 B1* | 9/2005 | Gandhi et al. | 455/425 |
| 7,286,848 B2* | 10/2007 | Vireday et al. | 455/550.1 |
| 7,610,040 B2* | 10/2009 | Cantini et al. | 455/410 |
| 7,756,509 B2* | 7/2010 | Rajagopalan et al. | 455/411 |
| 7,877,611 B2* | 1/2011 | Camacho et al. | 713/182 |
| 8,443,452 B2* | 5/2013 | Koulinitch et al. | 726/27 |
| 2005/0239445 A1 | 10/2005 | Karaoguz et al. | |
| 2005/0288002 A1 | 12/2005 | Sparks et al. | |
| 2006/0075467 A1* | 4/2006 | Sanda et al. | 726/1 |
| 2006/0280305 A1 | 12/2006 | Bajko et al. | |
| 2007/0143827 A1 | 6/2007 | Nicodemus et al. | |
| 2007/0147619 A1 | 6/2007 | Bellows et al. | |
| 2008/0072296 A1 | 3/2008 | Bensimon et al. | |
| 2010/0107225 A1 | 4/2010 | Spencer et al. | |

* cited by examiner

*Primary Examiner* — Wen-Tai Lin

(57) ABSTRACT

When a failure notification is received that was transmitted from a service node indicating a failure of a wireless communication device to pass an authentication when attempting to register with a communication network, device information, network data, and a user profile associated with the wireless communication device is retrieved and processed to generate a network access score for the wireless communication device. If the network access score exceeds a priority threshold, a priority notification is transferred instructing the service node to bypass the authentication for the wireless communication device. If the network access score exceeds a legitimate user threshold but does not exceed the priority threshold, an access notification is transferred instructing the service node to bypass the authentication for the wireless communication device, and subsequent usage of the wireless communication device is monitored for fraudulent activity. If the network access score does not exceed the legitimate user threshold, a suspect notification is transferred instructing the service node to maintain the authentication for the wireless communication device.

20 Claims, 6 Drawing Sheets

| MSID | DEVICE MEID | FIRMWARE VERSION | SERVICE ACTIVATION DATE | SERVICE EXPIRATION DATE | SERVICE TYPE | SERVICE PLAN | FRAUD HISTORY |
|---|---|---|---|---|---|---|---|
| 9134681111 | A100000 22AE429 | 4.01 | 2005-01-01 | 2012-01-01 | GOVT | VOICE + DATA | 0 |
| 9132124911 | A100000 445B922 | 3.41 | 2011-01-15 | 2011-02-15 | INDIVIDUAL | PREPAID | 6 |
| 9134442100 | A100000 B571C20 | 2.0 | 2009-06-06 | 2011-06-06 | CORP | VOICE ONLY | 1 |

USER PROFILE INFORMATION TABLE 410

| DEVICE MEID | MAKE | MODEL | FIRMWARE VERSION | EXPLOITABILITY | FRAUD RISK |
|---|---|---|---|---|---|
| A100000 22AE429 | PHONECO | ELITE | 4.01 | 0 | 1 |
| A100000 445B922 | DATAQUEST | PRO-200 | 3.41 | 9 | 10 |
| A100000 B571C20 | TRAVELCOMM | TRAVELMATE | 2.0 | 3 | 2 |

WIRELESS DEVICE INFORMATION TABLE 420

ACCESS MANAGEMENT FOR WIRELESS COMMUNICATION DEVICES FAILING AUTHENTICATION FOR A COMMUNICATION NETWORK

TECHNICAL BACKGROUND

A wireless communication device engages in a communication session with a communication network via a serving wireless access node. However, in order to establish the communication session, the wireless communication device must first successfully register with the network and pass authentication requirements prior to receiving authorization to access the communication network. To successfully register and authenticate, the wireless communication device typically provides security credentials to a network service node which validates this information prior to granting access to the network. For example, in a code division multiple access (CDMA) wireless network, service access security primarily relies on a physical device identifier associated with the wireless communication device, such as an electronic serial number (ESN), matching a logical identifier assigned to the device, such as a mobile station identifier (MSID).

Despite these security precautions, malicious individuals often modify and manipulate wireless communication devices to mimic the physical and logical identifiers of legitimate users to pass authentication and access the communication network for fraudulent purposes. Network operators therefore desire strong authentication techniques to prevent such illegitimate devices from accessing the network and engaging in fraudulent activity. However, legacy communication devices owned by legitimate users might fail to have all of the correct credentials and/or algorithms required to successfully pass modern authentication techniques, effectively barring these legitimate devices from accessing the network and impacting the users' experience.

Overview

A method of operating a network access control system to manage access to a communication network is disclosed. The method comprises receiving a failure notification transmitted from a service node indicating a failure of a wireless communication device to pass an authentication when attempting to register with the communication network, wherein the notification includes a device identifier that identifies the wireless communication device. The method further comprises retrieving device information, network data, and a user profile associated with the wireless communication device based on the device identifier. The method further comprises processing the device information, the network data, and the user profile to generate a network access score for the wireless communication device. The method further comprises, if the network access score exceeds a priority threshold, transferring a priority notification for delivery to the service node that instructs the service node to bypass the authentication for the wireless communication device. The method further comprises, if the network access score exceeds a legitimate user threshold but does not exceed the priority threshold, transferring an access notification for delivery to the service node that instructs the service node to bypass the authentication for the wireless communication device, and monitoring subsequent usage of the wireless communication device for fraudulent activity. The method further comprises, if the network access score does not exceed the legitimate user threshold, transferring a suspect notification for delivery to the service node that instructs the service node to maintain the authentication for the wireless communication device.

A network access control system to manage access to a communication network comprises a communication transceiver and a processing system. The communication transceiver is configured to receive a failure notification transmitted from a service node indicating a failure of a wireless communication device to pass an authentication when attempting to register with the communication network, wherein the notification includes a device identifier that identifies the wireless communication device. The processing system is configured to retrieve device information, network data, and a user profile associated with the wireless communication device based on the device identifier, process the device information, the network data, and the user profile to generate a network access score for the wireless communication device, and if the network access score exceeds a priority threshold, direct the communication transceiver to transfer a priority notification for delivery to the service node that instructs the service node to bypass the authentication for the wireless communication device. The processing system is configured to, if the network access score exceeds a legitimate user threshold but does not exceed the priority threshold, direct the communication transceiver to transfer an access notification for delivery to the service node that instructs the service node to bypass the authentication for the wireless communication device, and the processing system is further configured to monitor subsequent usage of the wireless communication device for fraudulent activity. The processing system is configured to, if the network access score does not exceed the legitimate user threshold, direct the communication transceiver to transfer a suspect notification for delivery to the service node that instructs the service node to maintain the authentication for the wireless communication device.

BRIEF DESCRIPTION OF THE DRAWINGS

FIG. 4 is a block diagram that illustrates a user profile information table and a wireless device information table in an exemplary embodiment.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
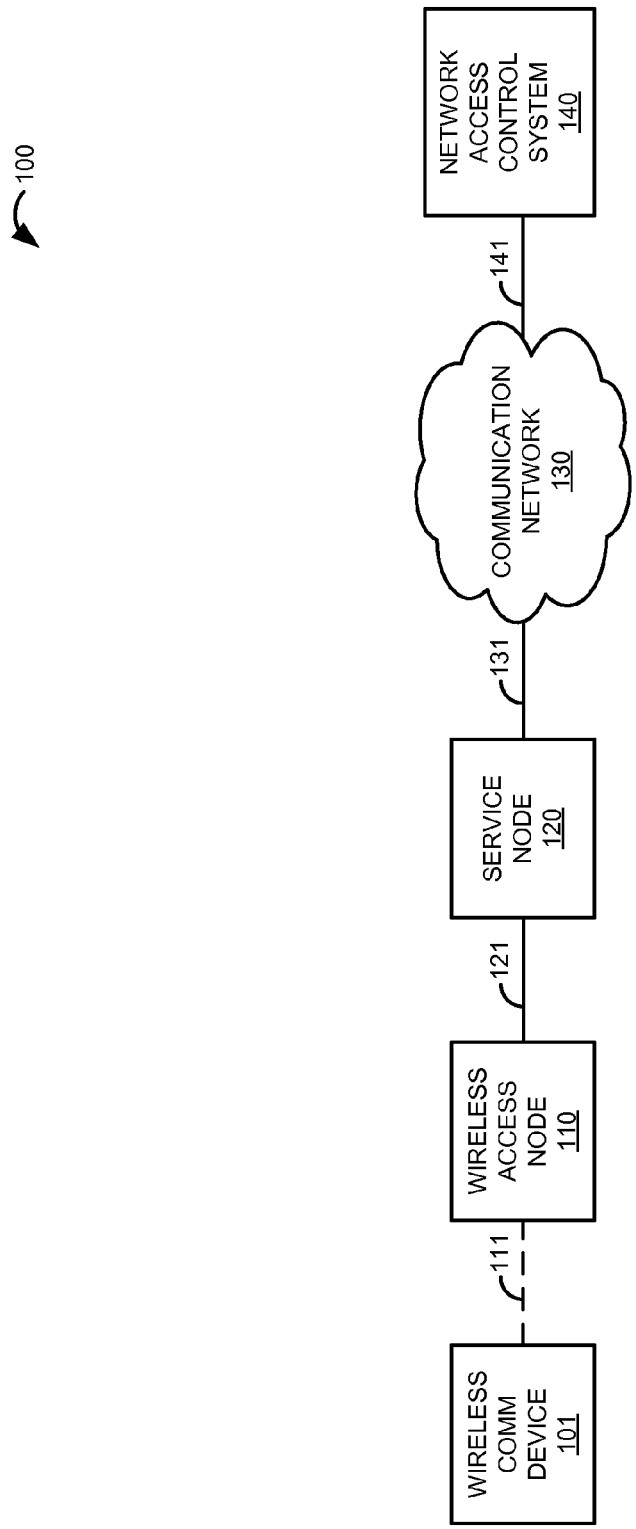
FIG. 1 is a block diagram that illustrates a communication system.

FIG. 1 is a block diagram that illustrates communication system 100. Communication system 100 includes wireless communication device 101, wireless access node 110, service node 120, communication network 130, and network access control system 140. Wireless communication device 101 and wireless access node 110 are in communication over wireless communication link 111. Wireless access node 110 and service node 120 communicate over communication link 121. Service node 120 and communication network 130 are in communication over communication link 131. Communication network 130 and network access control system 140 are in communication over communication link 141.

Figure 2:
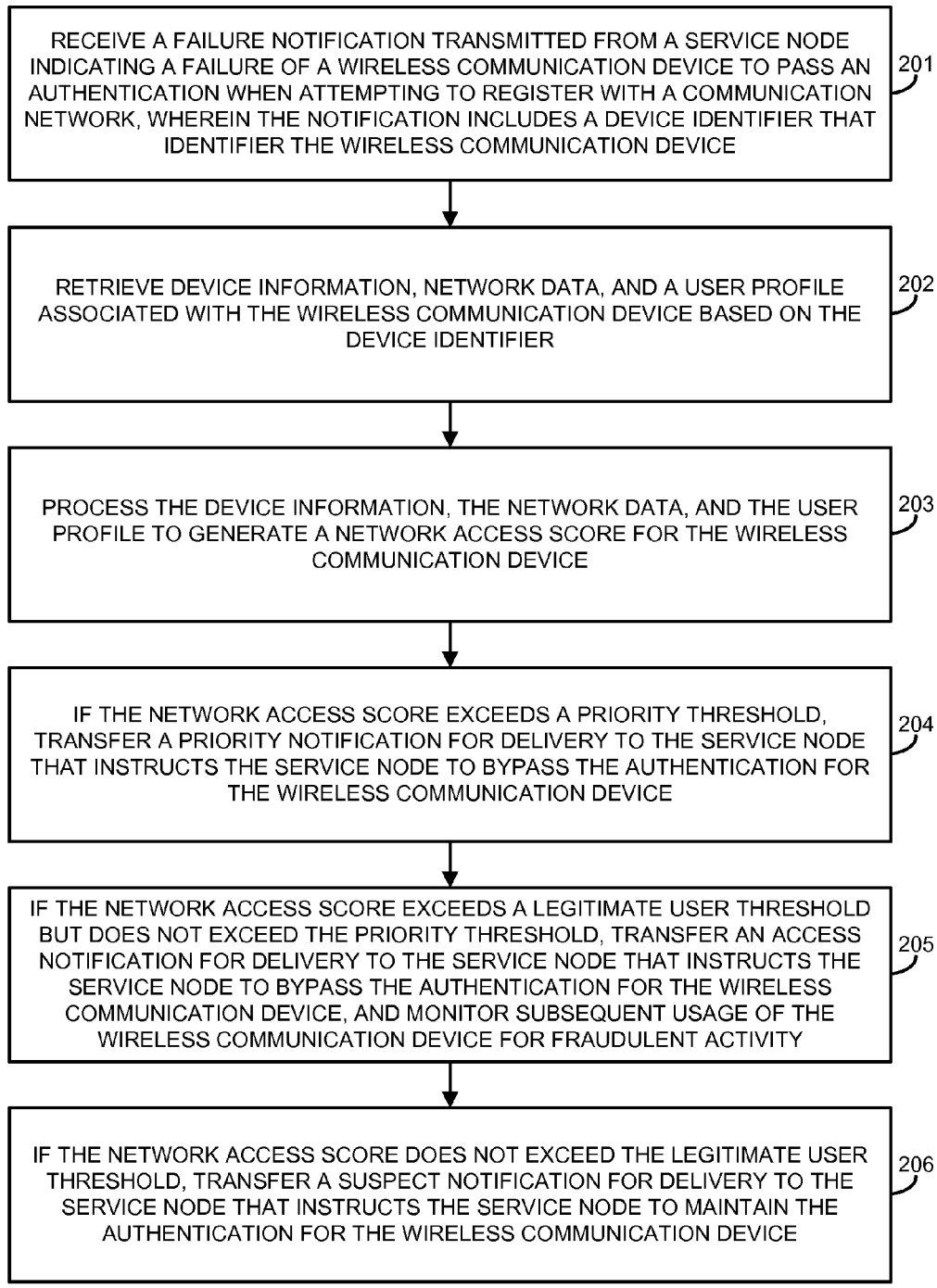
FIG. 2 is a flow diagram that illustrates an operation of the communication system.

FIG. 2 is a flow diagram that illustrates an operation of communication system 100. The steps of the operation are indicated below parenthetically. In particular, the operation of FIG. 2 shows a method of operating network access control system 140 to manage access to communication network 130.

In FIG. 2, network access control system 140 receives a failure notification transmitted from service node 120 indicating a failure of wireless communication device 101 to pass an authentication when attempting to register with communication network 130 (201). The authentication could utilize any technique, and in some examples, could provide an enhanced or increased level of security over standard or legacy authentication methods. For example, the authentication could comprise American National Standards Institute (ANSI)-41 authentication features. The notification includes a device identifier that identifies wireless communication device 101 (201). For example, the device identifier could comprise a Mobile Station International Subscriber Directory Number (MSISDN) or some other telephone number, Electronic Serial Number (ESN), Mobile Equipment Identifier (MEID), International Mobile Equipment Identity (IMEI), Media Access Control Identifier (MACID), or some other identifier that uniquely identifies wireless communication device 101—including combinations thereof.

In response to the failure notification, network access control system 140 retrieves device information, network data, and a user profile associated with wireless communication device 101 based on the device identifier (202). Typically, network access control system 140 retrieves this information from a network database and from network elements associated with the failure of wireless communication device 101 to pass the authentication when attempting to register with communication network 130, such as service node 120. For example, network access control system 140 could receive the network data from service node 120 in the form of specific information regarding the serving infrastructure associated with the failed registration attempt, such as a failure type associated with the failure of wireless communication device 101 to register with communication network 130, an identifier of service node 130, hardware and software versions of service node 130, general vendor level, a geographic location of service node 130 and/or wireless communication device 101, a date and time of the failure, and any other information that may be tracked by communication network 130 for use in the analysis of service failures. The network data also typically includes indicators of the effectiveness of the serving infrastructure involved in the service failure at successfully authenticating legitimate users and preventing fraudulent access, along with known technical limitations of the serving infrastructure, which may be used to determine a level of compatibility between the serving infrastructure and wireless communication device 101.

The device information retrieved by network access control system 140 typically comprises information associated with the wireless communication device 101 that failed to successfully authenticate to communication network 130. For example, the device information could include a make and model of wireless communication device 101, known technical limitations of device 101, software versions such as a firmware version and/or operating system version, exploitabilities of device 101, including an exploitability score that indicates the severity of security flaws associated with device 101 and/or a software version executing on device 101, a fraud risk score that indicates a frequency that wireless communication devices of the same device type as device 101 are utilized or targeted for fraudulent activity, and any other information associated with wireless communication device 101 or its device type.

Network access control system 140 typically retrieves the user profile from a subscriber database or some other network storage system. The user profile includes information associated with a user of the wireless communication device 101 involved in the service failure. In some examples, the user profile could comprise a service activation date, a service expiration date, authorized devices associated with the user, designated service infrastructure, user demographics, a service type, such as residential, individual, family, corporate, government, etc., a service plan, such as data and voice, voice only, prepaid, etc., and user identifiers, such as a Mobile Station Identifier (MSID), International Mobile Subscriber Identity (IMSI), Mobile Identification Number (MIN), User Identifier (UID), or some other identifier that identifies a user of wireless communication device 101. The user profile could also include service usage patterns associated with the user of wireless communication device 101, such as times of the day and days of the week that service is typically used, geographic areas where service is typically utilized, social maps, frequency of roaming usage, frequency and duration of local, long distance, and international calling, frequency of data usage, typical data usage amounts, data applications, web sites, and server paths typically accessed by the user, frequency of short message service (SMS) text messaging, and any other information associated with the use of communication network 130 by the user of wireless communication device 101. In addition, the user profile could comprise further metrics associated with the user of wireless communication device 101, such as a service failure history that indicates a frequency of failed registration attempts, fraudulent service usage history associated with the user of wireless communication device 101 that indicates verified and/or suspected fraudulent activity, fraud impact history that indicates a frequency that the user has been denied access to communication network 130, business impact and/or liability risk if the user is denied service, and any other historical service usage patterns associated with the user of wireless communication device 101.

Once network access control system 140 has retrieved the device information, network data, and user profile, network access control system 140 processes the device information, the network data, and the user profile to generate a network access score for wireless communication device 101 (203). Typically, the network access score for wireless communication device 101 is based on known service failure events, historical characteristics of the user, technical attributes of the wireless communication device 101 and/or the service infrastructure, and other information included in the device information, network data, and user profile. In some examples, each piece of information included in the device information, network data, and user profile is weighted with a score that may be used to determine the overall network access score for wireless communication device 101. The weights for the information could be predetermined, or could be determined dynamically by network access control system 140 based on detected activities and events. Generally, the network access score is indirectly related to a likelihood that wireless communication device 101 will be used for fraudulent purposes; for example, a lower network access score indicates a higher fraud threat, and vice versa. Of course, one of skill in the art will understand that the value of the network access score could be interpreted in different ways and still be used to achieve the same results as disclosed herein. The network access score for wireless communication device 101 is then compared to threshold values to determine instructions for the service node 120 for authenticating wireless communication device 101 on subsequent registration attempts.

If the network access score exceeds a priority threshold, network access control system 140 transfers a priority notification for delivery to service node 120 that instructs service node 120 to bypass the authentication for wireless communication device 101 (204). As discussed above, a higher network access score indicates a lower threat of fraud, so a network access score that exceeds the priority threshold comprises a relatively high network access score. For example, network access control system 140 could process the device information, the network data, and the user profile to determine that wireless communication device 101 is associated with an emergency service provider, such as a police officer, fire fighter, or emergency medical service worker, to generate a network access score that exceeds the priority threshold. In other examples, high-ranking government officials, VIP or gold-level users, military users, users belonging to a specialized group, such as members of a corporate account, and users having devices with a low exploitability might be given higher network access scores that exceed the priority threshold. In some examples, network access control system 140 could instruct service node 120 to bypass the authentication techniques that resulted in the failure notification for wireless communication device 101 but still apply a lower level of authentication to at least provide some security. Additionally, one of skill in the art will understand that references to exceeding a threshold as used herein could comprise meeting or exceeding the threshold in some examples.

If the network access score exceeds a legitimate user threshold but does not exceed the priority threshold, network access control system 140 transfers an access notification for delivery to service node 120 to bypass the authentication for wireless communication device 101, and network access control system 140 monitors subsequent usage of wireless communication device 101 for fraudulent activity (205). For example, a network access score that exceeds the legitimate user threshold indicates that wireless communication device 101 is likely a legitimate device and should be granted access to communication network 130, but since the network access score does not exceed the priority threshold, the activities of device 101 are monitored to prevent creating further exploitable security risks. In some examples, to monitor the subsequent usage of wireless communication device 101 for the fraudulent activity, network access control system 140 compares a service usage history of wireless communication device 101 to the subsequent usage of device 101 to detect the fraudulent activity. For example, if the service usage history of wireless communication device 101 indicates that the user typically only conducts voice calls from a particular geographic area, and the subsequent usage of device 101 after bypassing the authentication indicates that device 101 is being used for high-bandwidth data transfers from an atypical geographic area, such factors may be utilized by network access control system 140 to detect fraudulent activity by device 101.

In some examples, network access control system 140 could perform a heuristics-based analysis to detect patterns in geographic areas and locations where service usage is typically utilized by wireless communication device 101, velocity verification, call patterns within social maps, and other historical usage data, and compare these patterns to the usage of device 101 after bypassing the authentication to ensure that device 101 is not being used in a fraudulent manner. As part of this analysis, network access control system 140 could identify specific geographic areas that pose the greatest risk of impacting legitimate customers, such as regions with incomplete or incompatible serving infrastructures, determine wireless communication devices with service usage patterns operating within these regions, and attribute any service failures for these devices as likely caused by the incompatible serving infrastructure. Further, known fraudulent usage patterns, such as simultaneous and/or geographically-dispersed service usage or access attempts, high frequency of service rejections that may suggest failed attempts to guess security credentials, such as scanning for physical/logical identifiers, and other suspicious behavior could be monitored and identified by network access control system 140 to detect fraudulent activity by wireless communication device 101.

In consideration of preventing further exploitable security risks after waiving authentication for wireless communication device 101, network access control system 140 and/or service node 120 might impose restrictions on the subsequent usage of wireless communication device 101 if the network access score exceeds the legitimate user threshold but does not exceed the priority threshold. For example, call restrictions could be imposed on the subsequent usage of wireless communication device 101, such as allowing only local calls and blocking long distance and/or international calls, allowing only emergency number calls, allowing calls associated with low-risk numbers, instituting toll charge limits, or any other calling restrictions that could apply to wireless communication device 101. Further service restrictions could be imposed on wireless communication device 101, such as blocking data service and/or SMS usage, preventing device 101 from roaming, service restrictions based on a serving network element, such as service node 120, establishing specific geo-fences that restrict service usage if device 101 is not located in predetermined legitimate geographic areas, and any other restrictions on the subsequent usage of wireless communication device 101.

If the network access score does not exceed the legitimate user threshold, network access control system 140 transfers a suspect notification for delivery to service node 120 that instructs service node 120 to maintain the authentication for wireless communication device 101 (206). For example, network access control system 140 could process the device information, the network data, and the user profile to determine that wireless communication device 101 is associated with an exploitability and/or a high fraud risk score to generate a network access score that does not exceed the legitimate user threshold. In other examples, network access control system 140 might determine that wireless communication device 101 is associated with a fraudulent service usage history to generate a network access score that does not exceed the legitimate user threshold. Additionally or alternatively, network access control system 140 could instruct service node 120 to increase the authentication for wireless communication device 101 if the network access score does not exceed the legitimate user threshold in order to bolster security for communication network 130 with respect to device 101, thereby requiring a stronger degree of authentication for wireless communication device 101 than the authentication that triggered the failure notification from service node 120.

Advantageously, network access control system 140 intelligently manages access to communication network 130 for wireless communication device 101 when device 101 fails to pass authentication when attempting to register with the network 130. By determining the network access score for wireless communication device 101 based on network data, device information, and a user profile, network access control system 140 can make automatic, educated decisions on the potential security risks of allowing device 101 onto communication network 130 despite device 101 having previously failed authentication. In this manner, service outages and other negative impacts for legitimate users are mitigated, while fraudulent devices are identified and barred from accessing communication network 130.

Referring back to FIG. 1, wireless communication device 101 could comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof.

Service node 120 comprises a processing system and communication transceiver. Service node 120 may also include other components such as a router, server, data storage system, and power supply. Service node 120 may reside in a single device or may be distributed across multiple devices. Service node 120 may be a discrete system or may be integrated within other systems—including other systems within communication system 100. In some examples, service node 120 could comprise a mobile switching center, home location register, visitor location register, authentication, authorization, and accounting (AAA) server, authentication center, network switch, database, router, switching system, packet gateway, network gateway system, Internet access node, application server, firewall, or some other communication system—including combinations thereof.

Communication network 130 comprises the core network of a wireless communication provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Network access control system 140 comprises a processing system and communication transceiver. Network access control system 140 may also include other components such as a router, server, data storage system, and power supply. Network access control system 140 may reside in a single device or may be distributed across multiple devices. Network access control system 140 may be a discrete system or may be integrated within other systems—including other systems within communication system 100. In some examples, network access control system 140 could comprise a network switch, mobile switching center, database, router, switching system, packet gateway, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be direct links or could include intermediate networks, systems, or devices.

Figure 3:
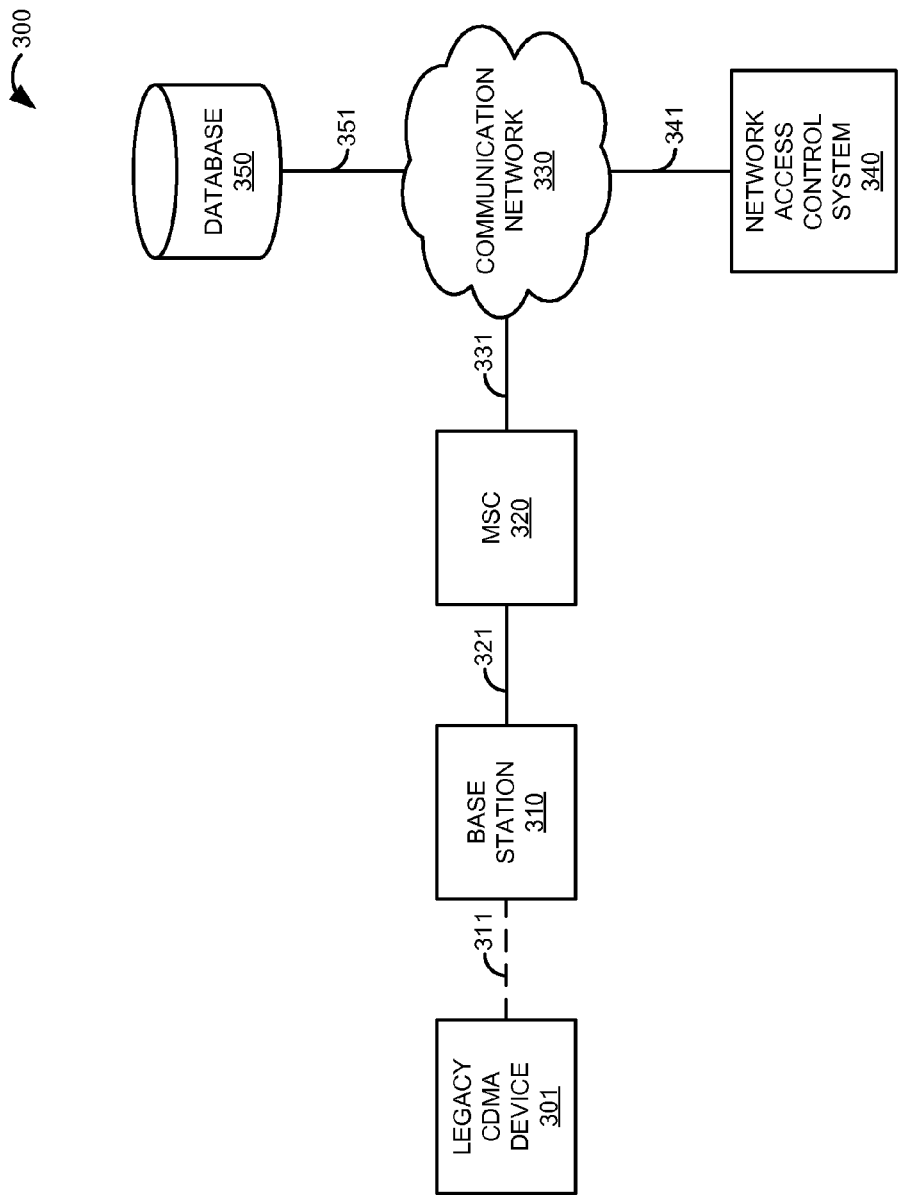
FIG. 3 is a block diagram that illustrates a communication system in an exemplary embodiment.

FIG. 3 is a block diagram that illustrates communication system 300. Communication system 300 includes legacy CDMA device 301, base station 310, mobile switching center (MSC) 320, communication network 330, network access control system 340, and database 350. Legacy CDMA device 301 and base station 310 are in communication over wireless communication link 311. Base station 310 and MSC 320 communicate over communication link 321. MSC 320 and communication network 330 are in communication over communication link 331. Communication network 330 and network access control system 340 are in communication over communication link 341, while database 350 and communication network 330 communicate over communication link 351.

FIG. 4 is a block diagram that illustrates user profile information table 410 and wireless device information table 420 in an exemplary embodiment. In this example, user profile information table 410 and wireless device information table 420 comprise tables in network database 350, although other data formats and structures could be used. Typically, the values in user profile information table 410 and wireless device information table 420 are populated by network access control system 340 and/or some other network element or system associated with communication network 330. In some examples, the information contained in user profile information table 410 and wireless device information table 420 could be predetermined, or could be dynamically updated based on real-time changes related to an account, device, or other attributes associated with a user and/or a wireless communication device.

User profile information table 410 includes columns labeled MSID, DEVICE MEID, FIRMWARE VERSION, SERVICE ACTIVATION DATE, SERVICE EXPIRATION DATE, SERVICE TYPE, SERVICE PLAN, and FRAUD HISTORY. In this example, the MSID is used as an index for user profile information table 410, in that each MSID is unique to a particular user. Each row in user profile table 410 represents related data associated with a particular MSID, such that the values in each of the columns for any given row are associated with the MSID of each corresponding row.

As previously discussed, the values in the MSID column represent user identifiers for different users of communication network 330. The values shown in the DEVICE MEID column represent device identifiers of wireless communication devices authorized for use by each respective user, such as legacy CDMA device 301, and the FIRMWARE VERSION column indicates a firmware version executing on each respective device. The SERVICE ACTIVATION DATE and SERVICE EXPIRATION DATE provide the service contract term length for each user from the date service was established to the expiration date. The values in the SERVICE TYPE column represent a type of service agreement with the user, and could include individual or group plans, residential, corporate, government, military, and other service types. The SERVICE PLAN column indicates the specific services that each respective user may utilize on communication network 330, such as voice service, data service, prepaid service, and other service plans. Finally, the FRAUD HISTORY column indicates potential or actual fraudulent activity that was previously detected by network access control system 340 and/or other network elements associated with communication network 330. In this example, the values in the FRAUD HISTORY column comprise a numerical score in the range of zero to ten, with lower numbers indicating users with little to no history of fraudulent activity and higher numbers indicating users having greater instances of verified and/or unverified fraud. Note that additional information associated with users of communication network 330 could be included in user profile information table 410, including multiple devices and service plans associated with a single user, but are not shown in table 410 for clarity.

Wireless device information table 420 includes information associated with wireless communication devices that may attempt to access communication network 330, such as legacy CDMA device 301. Wireless device information table 420 includes columns labeled DEVICE MEID, MAKE, MODEL, FIRMWARE VERSION, EXPLOITABILITY, and FRAUD RISK. The values shown in the DEVICE MEID column represent device identifiers of wireless communication devices authorized for use by each respective user, such as legacy CDMA device 301, and correspond to the DEVICE MEID column of user profile information table 410. Like the user profile information table 410, each row in wireless device information table 420 represents related data, such that the values in the DEVICE MEID field are associated with the values in the MAKE, MODEL, FIRMWARE VERSION, EXPLOITABILITY, and FRAUD RISK fields in each corresponding row.

The MAKE and MODEL fields of wireless device information table 420 indicate the respective manufacture name and model name/number of each wireless communication device listed in table 420. The FIRMWARE VERSION column provides a firmware version installed on each respective device. The EXPLOITABILITY column indicates how vulnerable a particular wireless communication device is to modification and manipulation attempts. In this example, the EXPLOITABILITY column comprises a numerical score in the range of zero to ten, with lower numbers indicating devices with less risk of their security features being compromised and higher numbers indicating devices that are more exploitable. Note that the exploitability value may be related to a software or firmware version executing on the device. For example, the DATAQUEST PRO-200 device with MEID A100000445B922 and firmware version 3.41 has an exploitability level of nine, but if this device were to receive a firmware update that patches security vulnerabilities, the exploitability level could decrease. Similarly, the values shown in the FRAUD RISK column comprise numerical scores in the range of zero to ten, with lower numbers indicating devices with lower frequencies of use for fraudulent activities, and higher numbers indicating devices that are more frequently targeted by illegitimate users and involved in fraudulent activity. The information in user profile information table 410 and wireless device information table 420 is utilized by network access control system 340 to assist in determining a network access score for a wireless communication device, such as legacy CDMA device 301.

Figure 5:
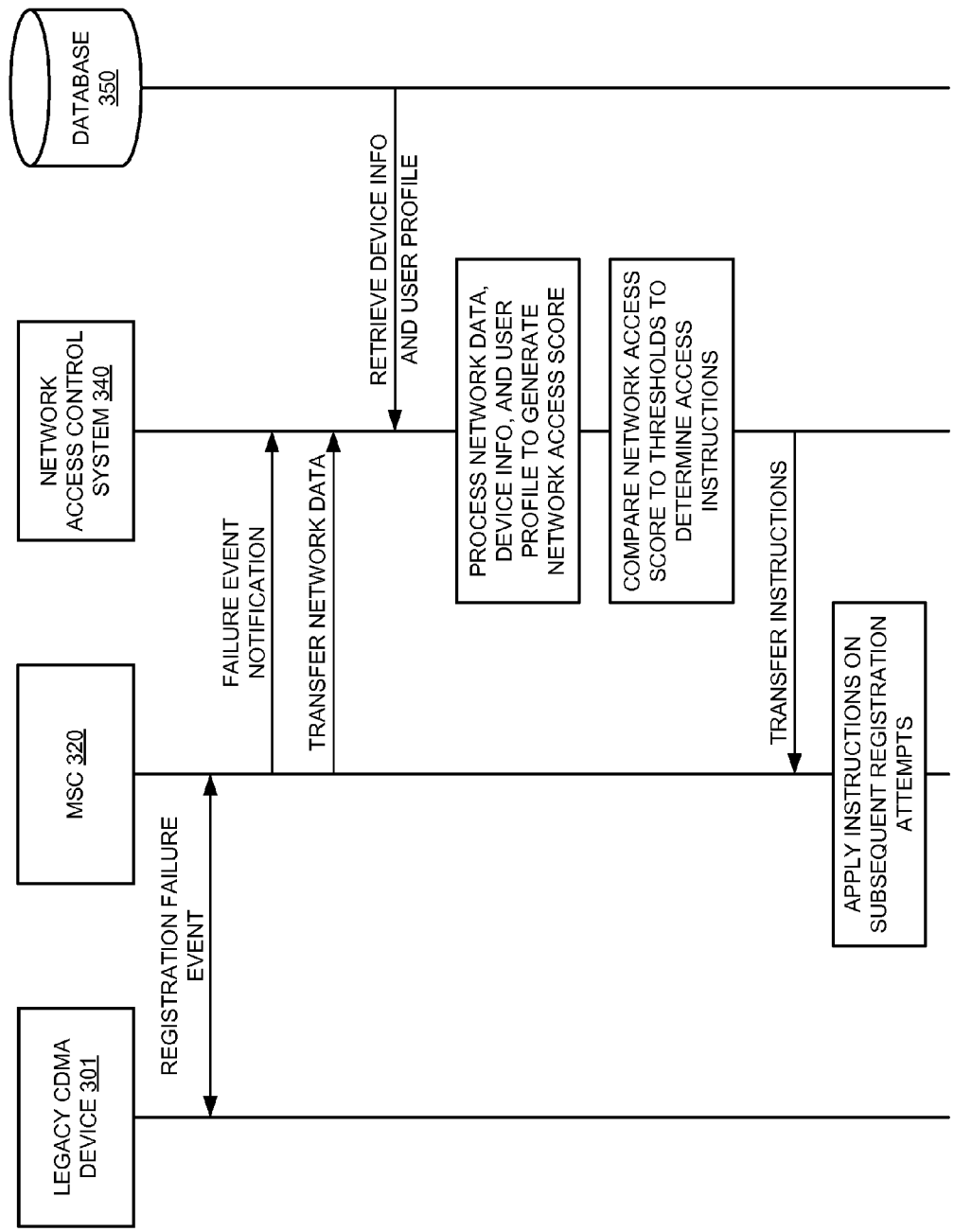
FIG. 5 is a sequence diagram that illustrates an operation of the communication system in an exemplary embodiment.

FIG. 5 is a sequence diagram that illustrates an operation of communication system 300 in an exemplary embodiment. The operation of FIG. 5 begins when a registration failure event occurs between legacy CDMA device 301 and MSC 320. In this example, MSC 320 utilizes ANSI-41 CDMA authentication techniques, which assumes that wireless communication devices are pre-provisioned with security credentials and algorithms by the manufacturer that are known to the MSC 320 and other network elements responsible for granting access to the voice and data services provided by communication network 330. However, in this case, legacy CDMA device 301 fails to have all the necessary and correct credentials and/or algorithms required to successfully register and authenticate with MSC 320, and thus device 301 fails to register and is denied service.

Upon the failed registration attempt by legacy CDMA device 301, MSC 320 transfers a failure event notification for delivery to network access control system 340. MSC 320 also transfers network data to network access control system 340, either separately or included with the failure event notification. The network data includes information known to MSC 320 at the time of the registration failure event, such as identifiers of MSC 320, base station 310, and device 301, vendor information associated with MSC 320, geographic locations/regions associated with MSC 320, base station 310, and/or device 301, and other information related to the failure event. In some examples, the network data could include information associated with the affected device 301 that failed registration, such as physical and logical identifiers, make, model, software versions, and other information provided by device 301 to MSC 320 during the registration attempt.

In response to the failure notification, network access control system 340 retrieves device information and a user profile associated with legacy CDMA device 301. Network access control system 340 could retrieve the device information and user profile based on any information received from MSC 320, but in this example, system 340 retrieves the information based on a device identifier for device 301 received from MSC 320. For example, if MSC 320 provides a device MEID of A10000022AE429 to network access control system 340, system 340 would retrieve the user profile and device information contained in the first row of both the user profile information table 410 and the wireless device information table 420 that correspond to this device MEID.

Network access control system 340 then processes the network data, device information, and user profile to generate a network access score for legacy CDMA device 301. The following discussion provides three examples that illustrate network access control system 340 processing network data, device information, and a user profile to generate a network access score for a legacy CDMA device 301 for three different users, identified by the different MEID numbers shown in tables 410 and 420 of FIG. 4 that are received by the network access control system 340 in these examples.

In the first example, if the device MEID of A10000022AE429 is received that corresponds to the first row of both tables 410 and 420, then network access control system 340 might determine a relatively high network access score for legacy device 301. Network access control system 340 could assign a network access score of nine on a scale of one to ten for device 301 in this first example. The score of nine could be based on many factors, including the user having established service for several years from the 2005-01-01 activation date, the "government" service type, the "voice+data" service plan, and the zero value in the fraud history column of table 410, along with the zero exploitability level and the value of one in the fraud risk column for the PHONECO ELITE device operating at firmware version 4.01 as shown in table 420. In addition, the network data or other information received by network access control system 340 could indicate that the user is operating device 301 in a typical geographic area where the device is used 94% of the time. Since all of these factors tend to indicate a low likelihood that this device is being used for fraudulent purposes, network access control system 340 assigns a value of nine for the network access score for device 301 in the first example.

Network access control system 340 then compares the network access score to a legitimate user threshold and a priority threshold to determine access instructions for MSC 320. In all three examples, the legitimate user threshold is five and the priority threshold is nine. Since network access control system 340 assigned a value of nine to device 301 with an MEID of A10000022AE429, legacy CDMA device 301 meets the priority threshold and thus qualifies for priority access to communication network 330. In other words, the high network access score reflects that device 301 is highly trusted and operated by a legitimate, high-priority government user, so network access control system 340 transfers instructions to MSC 320 to bypass the ANSI-41 CDMA authentication for device 301 upon subsequent registration attempts in the first example.

In the second example, if network access control system 340 receives a device MEID of A100000445B922 that corresponds to the second row of both tables 410 and 420, then network access control system 340 might determine a relatively low network access score for legacy device 301. Network access control system 340 could assign a network access score of one for device 301 in the second example based on several factors, including the user having recently established service based on the service activation date, the "individual" service type, the "prepaid" service plan, and the value of six in the fraud history column of table 410. Further, the DATAQUEST PRO-200 device operating with firmware version 3.41 identified by the MEID of A100000445B922 indicates an exploitability level of nine and a fraud risk of ten, meaning this device is highly exploitable, easily modified, and is often targeted by hackers for fraudulent activity. In addition, the network data received by network access control system 340 indicates that the user is operating device 301 in China, where the device has never been operated previously and thus is a very atypical geographic area for device 301. Since all of these factors tend to indicate a high likelihood that this device is being used for fraudulent purposes, network access control system 340 assigns a value of one for the network access score for device 301 in the second example.

Network access control system 340 then compares the network access score to the legitimate user threshold of five. Since network access control system 340 assigned a value of one to device 301 in the second example, legacy CDMA device 301 falls below the legitimate user threshold. Device 301 is therefore likely compromised and attempting to fraudulently bypass security measures, so in the second example, network access control system 340 transfers instructions to MSC 320 to maintain the ANSI-41 CDMA authentication for device 301 upon subsequent registration attempts. In some cases, additional security measures could also be taken, such as applying further authentication requirements beyond the ANSI-41 authentication for suspicious device 301, monitoring and imposing restrictions on subsequent usage if the device does successfully pass authentication, and notifying a fraud prevention system of the hacked device.

In the third and final example, network access control system 340 receives the device MEID of A100000B571C20 that corresponds to the third row of both tables 410 and 420. In this case, network access control system 340 might determine an average network access score for legacy device 301. In particular, the "corporate" service type, the "voice only" service plan, and the relatively low value of one in the fraud history column of table 410 might weigh against a likelihood that the device is being used fraudulently in this third example. However, the exploitability level of three and the fraud risk value of two for the TRAVELCOMM TRAVELMATE device running firmware version 2.0 as shown in table 420 might weigh slightly toward fraudulent usage. The network data or other information received by network access control system 340 could indicate that the user is operating device 301 in a typical geographic area where the device is used 68% of the time. Since all of these factors together tend to weigh slightly against fraudulent activity, network access control system 340 could assign the value of six for the network access score for device 301 in the third example.

Network access control system 340 then compares the network access score to the legitimate user threshold and the priority threshold to determine access instructions for MSC 320. In this third example, since the network access score of six exceeds the legitimate user threshold of five but does not exceed the priority threshold of nine, network access control system 340 transfers instructions to MSC 320 to bypass the ANSI-41 CDMA authentication for device 301 upon subsequent registration attempts. Additionally, network access control system 340 monitors the subsequent usage of device 301 for activity that matches fraudulent service usage patterns. For example, network access control system 340 could perform a heuristics-based analysis to detect patterns in geographic areas and locations where service usage is typically utilized by wireless communication device 301, velocity verification, call patterns within social maps, and other historical usage data, and compare these patterns to the usage of device 301 after bypassing the authentication to ensure that device 301 is not being used in a fraudulent manner inconsistent with historical usage patterns. Further, network access control system 340 could observe simultaneous and/or geographically-dispersed service usage or access attempts, high frequency of service rejections that may suggest failed attempts to guess security credentials, such as MSID scans, and other suspicious behavior to identify fraudulent activity by wireless communication device 301. If later fraudulent activity is detected, network access control system 340 could respond by decreasing the network access score for device 301 to a value below the legitimate user threshold, and instructing MSC 320 to require the strong ANSI-41 authentication for device 301 on subsequent registration attempts.

The three preceding examples illustrate how network access control system 340 could manage a network access score for a legacy CDMA device 301 and provide appropriate authentication instructions to MSC 320 if the device 301 fails to pass ANSI-41 CDMA authentication. By analyzing historical usage patterns for device 301, the exploitability, fraud risk, and other attributes associated with device 301, and known technical limitations of the serving infrastructure, network access control system 340 can intelligently determine the network access score for device 301, which provides a metric of how likely device 301 is being operated for legitimate purposes by a valid user. In this manner, network access control system 340 can effectively manage access to communication network 330 by allowing legitimate legacy devices to receive service while identifying devices that conduct fraudulent registration attempts and preventing such fraudulent devices from accessing the network 330.

Figure 6:
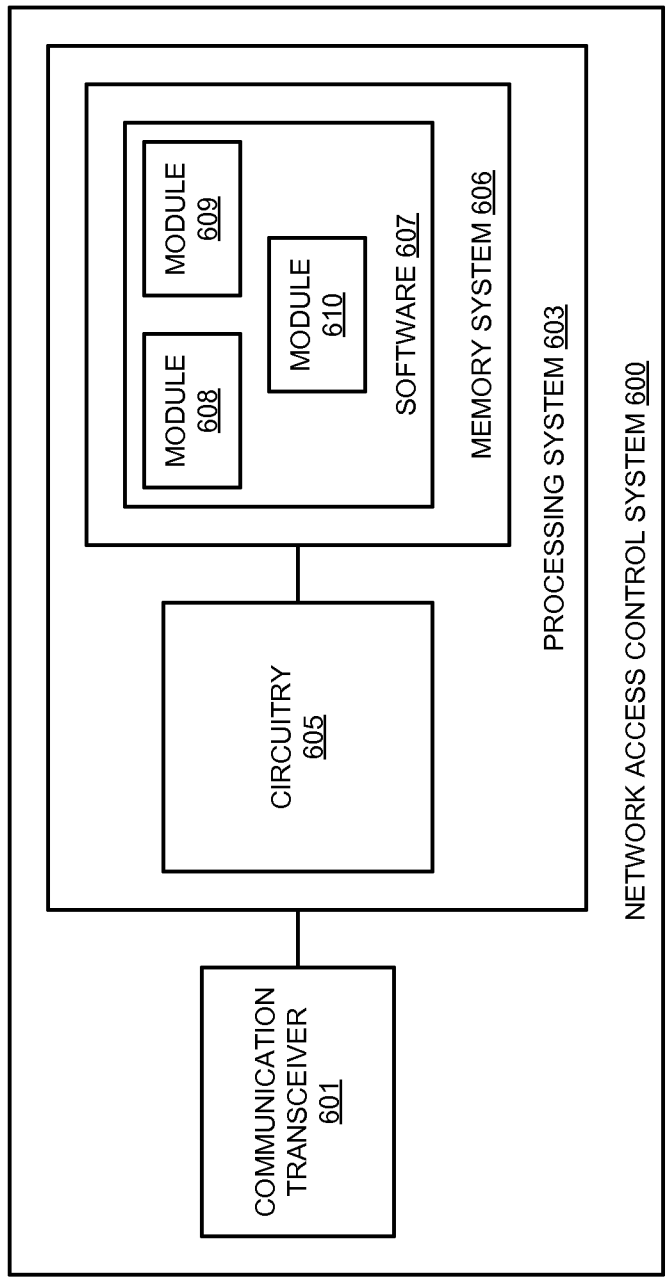
FIG. 6 is a block diagram that illustrates a network access control system.

FIG. 6 is a block diagram that illustrates network access control system 600. Network access control system 600 provides an example of network access control system 140, although system 140 may use alternative configurations. Network access control system 600 comprises communication transceiver 601 and processing system 603. Processing system 603 is linked to communication transceiver 601. Processing system 603 includes processing circuitry 605 and memory system 606 that stores operating software 607. Operating software 607 comprises software modules 608-610.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof. Communication transceiver 601 could be configured to receive a failure notification transmitted from a service node indicating a failure of a wireless communication device to pass an authentication when attempting to register with a communication network. Further, communication transceiver 601 could be configured to transfer a priority notification or an access notification for delivery to the service node that instructs the service node to bypass the authentication for the wireless communication device. In addition, communication transceiver 601 could be configured to transfer a suspect notification for delivery to the service node that instructs the service node to maintain the authentication for the wireless communication device.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-610, although software 607 could have alternative configurations in other examples.

When executed by circuitry 605, operating software 607 directs processing system 603 to operate as described herein for network access control system 140. In particular, operating software 607 may direct processing system 603 to direct communication transceiver 601 to receive a failure notification transmitted from a service node indicating a failure of a wireless communication device to pass an authentication when attempting to register with a communication network, wherein the notification includes a device identifier that identifies the wireless communication device. In addition, operating software 607 may direct processing system 603 to retrieve device information, network data, and a user profile associated with the wireless communication device based on the device identifier, and process the device information, the network data, and the user profile to generate a network access score for the wireless communication device. If the network access score exceeds a priority threshold, operating software 607 may direct processing system 603 to direct communication transceiver 601 to transfer a priority notification for delivery to the service node that instructs the service node to bypass the authentication for the wireless communication device. If the network access score exceeds a legitimate user threshold but does not exceed the priority threshold, operating software 607 may direct processing system 603 to direct communication transceiver 601 to transfer an access notification for delivery to the service node that instructs the service node to bypass the authentication for the wireless communication device, and direct processing system 603 to monitor subsequent usage of the wireless communication device for fraudulent activity. Finally, if the network access score does not exceed the legitimate user threshold, operating software 607 may direct processing system 603 to direct communication transceiver 601 to transfer a suspect notification for delivery to the service node that instructs the service node to maintain the authentication for the wireless communication device.

In this example, operating software 607 comprises a registration failure software module 608 that receive a failure notification transmitted from a service node indicating a failure of a wireless communication device to pass an authentication when attempting to register with a communication network, wherein the notification includes a device identifier that identifies the wireless communication device. Additionally, operating software 607 comprises a network access score calculation software module 609 that retrieves device information, network data, and a user profile associated with the wireless communication device based on the device identifier, and processes the device information, the network data, and the user profile to generate a network access score for the wireless communication device. Further, operating software 607 also comprises a score comparison software module 610 that transfers a priority notification for delivery to the service node that instructs the service node to bypass the authentication for the wireless communication device if the network access score exceeds a priority threshold, transfers an access notification for delivery to the service node that instructs the service node to bypass the authentication for the wireless communication device and monitors subsequent usage of the wireless communication device for fraudulent activity if the network access score exceeds a legitimate user threshold but does not exceed the priority threshold, and transfers a suspect notification for delivery to the service node that instructs the service node to maintain the authentication for the wireless communication device if the network access score does not exceed the legitimate user threshold.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a network access control system to manage access to a communication network, the method comprising:
   receiving a failure notification transmitted from a service node indicating a failure of a wireless communication device to pass an authentication when attempting to register with the communication network, wherein the notification includes a device identifier that identifies the wireless communication device;
   retrieving device information, network data, and a user profile associated with the wireless communication device based on the device identifier;
   processing the device information, the network data, and the user profile to generate a network access score for the wireless communication device;
   if the network access score exceeds a priority threshold, transferring a priority notification for delivery to the service node that instructs the service node to bypass the authentication for the wireless communication device;
   if the network access score exceeds a legitimate user threshold but does not exceed the priority threshold, transferring an access notification for delivery to the service node that instructs the service node to bypass the authentication for the wireless communication device and monitoring subsequent usage of the wireless communication device for fraudulent activity; and
   if the network access score does not exceed the legitimate user threshold, transferring a suspect notification for delivery to the service node that instructs the service node to maintain the authentication for the wireless communication device.

2. The method of claim 1 wherein processing the device information, the network data, and the user profile to generate the network access score for the wireless communication device comprises determining that the wireless communication device is associated with an emergency service provider to generate the network access score that exceeds the priority threshold.

3. The method of claim 1 wherein processing the device information, the network data, and the user profile to generate the network access score for the wireless communication device comprises processing a device type of the wireless communication device to generate the network access score.

4. The method of claim 1 wherein monitoring the subsequent usage of the wireless communication device for the fraudulent activity comprises comparing a service usage history of the wireless communication device to the subsequent usage of the wireless communication device to detect the fraudulent activity.

5. The method of claim 1 wherein, if the network access score exceeds the legitimate user threshold but does not exceed the priority threshold, imposing restrictions on the subsequent usage of the wireless communication device.

6. The method of claim 1 wherein processing the device information, the network data, and the user profile to generate the network access score for the wireless communication device comprises determining that the wireless communication device is associated with an exploitability to generate the network access score that does not exceed the legitimate user threshold.

7. The method of claim 1 wherein processing the device information, the network data, and the user profile to generate the network access score for the wireless communication device comprises determining that the wireless communication device is associated with a fraudulent service usage history to generate the network access score that does not exceed the legitimate user threshold.

8. The method of claim 1 wherein the network data comprises a failure type associated with the failure of the wireless communication device to register with the communication network, an identifier of the service node, a geographic location of the service node, and a time of the failure.

9. The method of claim 1 wherein the user profile comprises a service activation date, a service expiration date, a service type, a service plan, authorized devices, and a fraudulent service usage history associated with the user of the wireless communication device.

10. The method of claim 1 wherein the device information comprises a model and a firmware version of the wireless communication device.

11. A network access control system to manage access to a communication network, the system comprising:
   a communication transceiver configured to receive a failure notification transmitted from a service node indicating a failure of a wireless communication device to pass an authentication when attempting to register with the communication network, wherein the notification includes a device identifier that identifies the wireless communication device; and a processing system configured to retrieve device information, network data, and a user profile associated with the wireless communication device based on the device identifier, process the device information, the network data, and the user profile to generate a network access score for the wireless communication device, and if the network access score exceeds a priority threshold, direct the communication transceiver to transfer a priority notification for delivery to the service node that instructs the service node to bypass the authentication for the wireless communication device;

the processing system configured to, if the network access score exceeds a legitimate user threshold but does not exceed the priority threshold, direct the communication transceiver to transfer an access notification for delivery to the service node that instructs the service node to bypass the authentication for the wireless communication device, and the processing system further configured to monitor subsequent usage of the wireless communication device for fraudulent activity; and the processing system configured to, if the network access score does not exceed the legitimate user threshold, direct the communication transceiver to transfer a suspect notification for delivery to the service node that instructs the service node to maintain the authentication for the wireless communication device.

12. The system of claim 11 wherein the processing system configured to process the device information, the network data, and the user profile to generate the network access score for the wireless communication device comprises the processing system configured to determine that the wireless communication device is associated with an emergency service provider to generate the network access score that exceeds the priority threshold.

13. The system of claim 11 wherein the processing system configured to process the device information, the network data, and the user profile to generate the network access score for the wireless communication device comprises the processing system configured to process a device type of the wireless communication device to generate the network access score.

14. The system of claim 11 wherein the processing system configured to monitor the subsequent usage of the wireless communication device for the fraudulent activity comprises the processing system configured to compare a service usage history of the wireless communication device to the subsequent usage of the wireless communication device to detect the fraudulent activity.

15. The system of claim 11 wherein the processing system is configured to, if the network access score exceeds the legitimate user threshold but does not exceed the priority threshold, impose restrictions on the subsequent usage of the wireless communication device.

16. The system of claim 11 wherein the processing system configured to process the device information, the network data, and the user profile to generate the network access score for the wireless communication device comprises the processing system configured to determine that the wireless communication device is associated with an exploitability to generate the network access score that does not exceed the legitimate user threshold.

17. The system of claim 11 wherein the processing system configured to process the device information, the network data, and the user profile to generate the network access score for the wireless communication device comprises the processing system configured to determine that the wireless communication device is associated with a fraudulent service usage history to generate the network access score that does not exceed the legitimate user threshold.

18. The system of claim 11 wherein the network data comprises a failure type associated with the failure of the wireless communication device to register with the communication network, an identifier of the service node, a geographic location of the service node, and a time of the failure.

19. The system of claim 11 wherein the user profile comprises a service activation date, a service expiration date, a service type, a service plan, authorized devices, and a fraudulent service usage history associated with the user of the wireless communication device.

20. A method of operating a network access control system to manage access to a communication network, the method comprising:

receiving a failure notification transmitted from a service node indicating a failure of a wireless communication device to pass an authentication when attempting to register with the communication network, wherein the notification includes a device identifier that identifies the wireless communication device;

retrieving device information, network data, and a user profile associated with the wireless communication device based on the device identifier;

processing the device information, the network data, and the user profile to generate a network access score for the wireless communication device;

if the network access score exceeds a priority threshold, transferring a priority notification for delivery to the service node that instructs the service node to bypass the authentication for the wireless communication device;

if the network access score exceeds a legitimate user threshold but does not exceed the priority threshold, transferring an access notification for delivery to the service node that instructs the service node to bypass the authentication for the wireless communication device, imposing restrictions on subsequent usage of the wireless communication device, and monitoring the subsequent usage of the wireless communication device for fraudulent activity by comparing a service usage history of the wireless communication device to the subsequent usage of the wireless communication device to detect the fraudulent activity; and if the network access score does not exceed the legitimate user threshold, transferring a suspect notification for delivery to the service node that instructs the service node to maintain the authentication for the wireless communication device.

* * * * *